Patented June 25, 1946

2,402,837

UNITED STATES PATENT OFFICE 2,402,837

PROCESS OF VULCANIZING NEOPRENE

James P. Nowlen, Wilmington, Del., and Maynard F. Torrence, Woodstown, N. J., assignors to E. I. du Pont de Nemours & Company, Wilmington, Del., a corporation of Delaware No Drawing. Application March 2, 1943, Serial No. 477,772

16 Claims. (Cl. 260—92.7)

This invention relates to a process for vulcanizing neoprene (polymerized chloro-2-butadiene-1,3) by the use of metallic salts of organic monocarboxylic acids the dissociation constant of which is less than $1.0 \times 10^{-3}$.

In the vulcanization of neoprene (chloro-2-butadiene-1,3) the stock is usually heated in the presence of certain metallic oxides with or without the addition of sulfur and usually in the presence of vulcanization accelerators. It has been found, however, that some stocks tend to prevulcanize during processing, extrusion or calendering, especially if the uncompounded polymer employed in the mix is not recently prepared neoprene. The tendency of the stocks to prevulcanize is especially pronounced when organic accelerators are employed. This condition is generally referred to as "scorchiness," and results in a great loss of time and material. Extensive research has therefore been carried out in an attempt to find some way of retarding the rate of vulcanization at temperatures and under conditions normally employed in the processing of the stock and yet which would not adversely affect the rate of vulcanization at the curing or vulcanizing temperatures.

It is, therefore, an object of this invention to provide a process for vulcanizing neoprene (polymerized chloro-2-butadiene-1,3) in the presence of zinc oxide and magnesium oxide wherein the danger of "scorchiness" is either minimized or completely eliminated. It is a further object of the invention to improve the vulcanization of polymerized chloro-2-butadiene-1,3 by employing vulcanization retarders, together with vulcanization accelerators and accelerator-activators whereby stocks are produced which are sufficiently safe at processing temperatures for commercial utilization and yet at the same time are active at the curing temperatures. A still further object of the invention is to provide vulcanized polymerized chloro-2-butadiene-1,3 having improved properties.

We have found that the vulcanization in the presence of zinc oxide and magnesium oxide of polymerized chloro-2-butadiene-1,3 can be retarded by incorporating therein metallic salts of organic mono-carboxylic acids which have a dissociation constant of less than $1.0 \times 10^{-3}$. These compounds have the property of retarding the rate of vulcanization of neoprene at processing temperatures of around 227° F. without retarding the rate of vulcanization at curing temperatures such as about 274° F. These compounds may be used alone or in conjunction with organic accelerators and accelerator-activators to produce neoprene stocks which exhibit excellent physical properties and show high resistance toward aging and high temperature deterioration as well as improved resiliency.

The following table is given to show the dissociation constant of some of the more common organic acids and the effectiveness of their salts in retarding the rate of vulcanization of neoprene.

Table I

| Acid | Dissociation constant | Effectiveness of the sodium salt |
|---|---|---|
| Trichloracetic | $2.0 \times 10^{-1}$ | Ineffective. |
| Oxalic | $3.8 \times 10^{-2}$ | Do. |
| Mono-chloracetic | $1.55 \times 10^{-3}$ | Do. |
| Tartaric | $1.1 \times 10^{-3}$ | Do. |
| Formic | $2.14 \times 10^{-4}$ | Effective. |
| Lactic | $1.38 \times 10^{-4}$ | Do. |
| Beta-naphthoic | $6.8 \times 10^{-5}$ | Do. |
| Benzoic | $6.6 \times 10^{-5}$ | Do. |
| Crotonic | $3.5 \times 10^{-5}$ | Do. |
| Acetic | $1.86 \times 10^{-5}$ | Do. |
| Caprylic | $1.41 \times 10^{-5}$ | Do. |

The salts are classified as effective when they retard the rate of vulcanization at 227° F. but not at 274° F., and as ineffective when they either fail to retard the rate of vulcanization at 227° F. or retard at both 227° F. and 274° F.

In order to illustrate the advantages obtainable by using the compounds of this invention, the following stocks were prepared.

*Table II*

|  | Stock | | |
|---|---|---|---|
|  | 1 | 2 | 3 |
| Neoprene [1] | 100.0 | 100.0 | 100.0 |
| Phenyl alpha naphthylamine | 1.0 | 1.0 | 1.0 |
| Extra light calcined magnesia | 4.0 | 4.0 | 4.0 |
| Channel carbon black | 10.0 | 10.0 | 10.0 |
| Zinc oxide | 5.0 | 5.0 | 5.0 |
| Sodium acetate |  | 2.0 |  |
| Sodium caprylate |  |  | 2.0 |

[1] Neoprene prepared according to the method described in U. S. P. 2,264,173, Example 25, and stored five months.

CURE: 60 MIN. AT 227° F.

|  |  |  |  |
|---|---|---|---|
| Modulus at 600%, lbs./sq. in | 650 | 200 | 250 |
| Tensile strength, lbs./sq. in | 2,050 | 775 | 625 |
| Elongation at break (percent) | 1,210 | 1,380 | 1,235 |

CURE: 60 MIN. AT 274° F.

|  |  |  |  |
|---|---|---|---|
| Modulus at 600%, lbs./sq. in | 1,850 | 2,250 | 2,125 |
| Tensile strength, lbs./sq. in | 4,050 | 3,650 | 3,450 |
| Elongation at break (percent) | 895 | 760 | 730 |
| Hardness (Shore) [3] | 50 | 52 | 52 |
| Stability test at 120° F |  |  |  |
| No. of days to set up | 4 | 16 | ([2]) |

[2] Test not made.
[3] Method described by Larrick, Rubber Age, Sept. 1940, p. 287.

As illustrated above, there is a marked reduction in the rate of vulcanization at 227° F., between Stock No. 1 and 2 or 3, which contain a retardant. The rate of vulcanization in the cure at 227° F. is indicative of the tendency of the stock to pre-vulcanize at processing temperatures. The modulus and tensile strength shown by Stock No. 1 are high enough to indicate the danger of pre-vulcanization during processing. The modulus and tensile strength shown by Stock No. 2 or 3 are sufficiently low to indicate processing safety.

Another method of determining the efficiency of a retarder is the so-called stability test conducted at 120° F., in which the time necessary for the stock to pre-vulcanize is determined. In performing this test the uncured stock is stored in an oven at 120° F. At frequent intervals portions of the stock are removed and milled on an ordinary rubber mill to form a smooth sheet. When the aged stock has pre-vulcanized to such an extent that it can no longer be milled to a smooth sheet, it is said to be "set up." From the data shown in the above table it can be seen that sodium acetate markedly improves the stability of neoprene stocks.

In the cure at 274° F. it is shown that these materials do not retard the rate of vulcanization, but produce a slight activating effect, as shown by the increase in modulus at 600% elongation. It is characteristic of neoprene stocks, in which the rate of vulcanization has been increased, to show a slight increase in hardness, a somewhat lower elongation at break, and consequently a somewhat lower tensile strength. This effect is shown by Stocks Nos. 2 and 3.

In order to illustrate the advantages obtainable by the use of these retardants with a recently prepared neoprene, the following stocks were tested, in each case the neoprene being the same as employed in the examples of Table II.

*Table III*

|  | Stock | | | | |
|---|---|---|---|---|---|
|  | 4 | 5 | 6 | 7 | 8 |
| Neoprene | 100.0 | 100.0 | 100.0 | 100.0 | 100.0 |
| Phenyl alpha naphthylamine | 1.0 | 1.0 | 1.0 | 1.0 | 1.0 |
| Extra light calcined magnesia | 4.0 | 4.0 | 4.0 | 4.0 | 4.0 |
| Channel carbon black | 10.0 | 10.0 | 10.0 | 10.0 | 10.0 |
| Zinc oxide | 5.0 | 5.0 | 5.0 | 5.0 | 5.0 |
| Sodium acetate |  | 1.0 |  |  |  |
| Zinc acetate |  |  | 1.0 |  |  |
| Iron acetate |  |  |  | 1.0 |  |
| Lead acetate |  |  |  |  | 1.0 |

CURE: 60 MIN. AT 227° F.

|  |  |  |  |  |  |
|---|---|---|---|---|---|
| Modulus at 600%, lbs./sq. in | 75 | No cure | No cure | No cure | No cure |
| Tensile strength, lbs./sq. in | 550 | | | | |
| Elongation at break, per cent | 1,280 | | | | |

CURE: 60 MIN. AT 274° F.

|  |  |  |  |  |  |
|---|---|---|---|---|---|
| Modulus at 600%, lbs./sq. in | 1,450 | 1,825 | 1,450 | 1,425 | 1,500 |
| Tensile strength, lbs./sq. in | 3,900 | 3,700 | 3,625 | 4,025 | 3,650 |
| Elongation at break, per cent | 925 | 835 | 880 | 895 | 840 |
| Hardness (Shore) | 49 | 50 | 52 | 50 | 52 |

In Table III it can be seen that various metallic salts of acetic acid have a pronounced retarding effect on the rate of vulcanization in the cure at 227° F. It is plainly seen that these metallic salts do not retard the rate of vulcanization in the cure at 274° F.

For many commercial uses it is desirable to employ organic accelerators in the vulcanization of neoprene. We have found that the retarders of our invention are also effective in the presence of an organic accelerator. In order to illustrate this fact the following tests were made.

Parazone (para phenyl phenol), a very mild accelerator which is used to increase heat resistance yet tends to produce stocks which are "scorchy," was tested with various retarders as follows, the neoprene being the same as employed in Table II.

*Table IV*

|  | Stock | | |
|---|---|---|---|
|  | 9 | 10 | 11 |
| Neoprene | 100.0 | 100.0 | 100.0 |
| Phenyl alpha naphthylamine | 1.0 | 1.0 | 1.0 |
| Parazone | 1.0 | 1.0 | 1.0 |
| Extra light calcined magnesia | 4.0 | 4.0 | 4.0 |
| Channel carbon black | 10.0 | 10.0 | 10.0 |
| Zinc oxide | 5.0 | 5.0 | 5.0 |
| Potassium formate |  | 1.0 |  |
| Sodium acetate |  |  | 1.0 |

CURE: 60 MIN. AT 227° F.

|  |  |  |  |
|---|---|---|---|
| Modulus at 600%, lbs./sq. in | 775 |  | 100 |
| Tensile strength, lbs./sq. in | 1,900 | 325 | 450 |
| Elongation at break, per cent | 1,155 | 1,400 | 1,310 |

CURE: 60 MIN. AT 274° F.

|  |  |  |  |
|---|---|---|---|
| Modulus at 600%, lbs./sq. in | 1,575 | 1,800 | 1,825 |
| Tensile strength, lbs./sq. in | 4,425 | 4,425 | 4,225 |
| Elongation at break, per cent | 950 | 890 | 880 |
| Hardness (shore) | 50 | 50 | 54 |

In Table IV it can be seen that a metallic salt of either formic or acetic acid shows a pronounced retarding effect on the rate of vulcanization of neoprene in the cure at 227° F., in the presence of Parazone. In the cure at 274° F. these metallic salts do not retard the rate of vulcanization.

From a practical standpoint some stearic acid is normally used in neoprene as a lubricating agent to aid in processing, calendering and extrusion of the stock. In order to show that the retarders of our invention are effective in such a stock, the following tests were made, the neoprene being the same as employed in Table II.

Table V

|  | Stock | | | | |
|---|---|---|---|---|---|
|  | 9 | 13 | 14 | 15 | 16 |
| Neoprene | 100.0 | 100.0 | 100.0 | 100.0 | 100.0 |
| Stearic acid | 2.0 | 2.0 | 2.0 | 2.0 | 2.0 |
| Phenyl alpha naphthylamine | 1.0 | 1.0 | 1.0 | 1.0 | 1.0 |
| Parazone | 1.0 | 1.0 | 1.0 | 1.0 | 1.0 |
| Extra light calcined magnesia | 4.0 | 4.0 | 4.0 | 4.0 | 4.0 |
| Channel carbon black | 10.0 | 10.0 | 10.0 | 10.0 | 10.0 |
| Zinc oxide | 5.0 | 5.0 | 5.0 | 5.0 | 5.0 |
| Ammonium acetate |  | 1.0 |  |  |  |
| Sodium stearate |  |  | 1.0 |  |  |
| Sodium oleate |  |  |  | 1.0 |  |
| Sodium laurylate |  |  |  |  | 1.0 |

CURE: 60 MIN. AT 227° F.

| | | | | | |
|---|---|---|---|---|---|
| Modulus at 600%, lbs./sq. in | 775 |  | 650 | 100 |  | 
| Tensile strength, lbs./sq. in | 1,900 | 650 | 600 | 475 | No cure |
| Elongation at break, per cent | 1,155 | 1,450 | 1,360 | 1,410 |  |

CURE: 60 MIN. AT 274° F.

| | | | | | |
|---|---|---|---|---|---|
| Modulus at 600%, lbs./sq. in | 1,575 | 2,100 | 1,550 | 1,425 | 1,550 |
| Tensile strength, lbs./sq. in | 4,425 | 3,400 | 3,425 | 3,450 | 3,550 |
| Elongation at break, per cent | 950 | 735 | 870 | 885 | 855 |
| Hardness (Shore) | 50 | 56 | 52 | 54 | 50 |

In Table V it can be seen that these materials show a pronounced retarding effect on the rate of vulcanization in the cure at 227° F. In the cure at 274° F. these materials do not adversely affect the rate of vulcanization. It can also be seen that a large number of metallic salts of organic mono-carboxylic acids are equally effective in their retarding action.

In order to show that the retarding action produced by these metallic salts on the rate of vulcanization of neoprene is not limited to a narrow range of concentrations the following tests were made, the neoprene being the same as employed in Table II.

Table VI

|  | Stock | | | | |
|---|---|---|---|---|---|
|  | 17 | 18 | 19 | 20 | 21 |
| Neoprene | 100.0 | 100.0 | 100.0 | 100.0 | 100.0 |
| Stearic acid | 2.0 | 2.0 | 2.0 | 2.0 | 2.0 |
| Phenyl alpha naphthylamine | 1.0 | 1.0 | 1.0 | 1.0 | 1.0 |
| Parazone | 1.0 | 1.0 | 1.0 | 1.0 | 1.0 |
| Extra light calcined magnesia | 4.0 | 4.0 | 4.0 | 4.0 | 4.0 |
| Channel carbon black | 10.0 | 10.0 | 10.0 | 10.0 | 10.0 |
| Zinc oxide | 5.0 | 5.0 | 5.0 | 5.0 | 5.0 |
| Sodium acetate (hydrated) |  | 0.10 | 1.0 |  | 8.0 |
| Sodium acetate (anhydrous) |  |  |  | 1.0 |  |

CURE: 60 MIN. AT 227° F.

| | | | | | |
|---|---|---|---|---|---|
| Modulus at 600%, lbs./sq. in | 275 | 75 | 50 | 50 | 125 |
| Tensile strength, lbs./sq. in | 950 | 750 | 375 | 375 | 575 |
| Elongation at break, percent | 1,365 | 1,360 | 1,240 | 1,200 | 1,210 |

CURE: 60 MIN. AT 274° F.

| | | | | | |
|---|---|---|---|---|---|
| Modulus at 600%, lbs./sq. in | 1,350 | 1,450 | 1,850 | 1,725 | 1,850 |
| Tensile strength, lbs./sq. in | 4,250 | 4,125 | 3,700 | 3,775 | 3,275 |
| Elongation at break, percent | 965 | 930 | 830 | 850 | 770 |
| Hardness (Shore) | 49 | 50 | 52 | 52 | 58 |

In Table VI it can be seen that even with very small amounts of sodium acetate the retarding effect in the cure at 227° F. is obtained. Stocks Nos. 19 and 20 show that either the hydrated or anhydrous salt may be used with essentially identical results. Stock No. 21 shows that large amounts of the retarder may be used, if desired, although no corresponding advantage is obtained.

For certain neoprene stocks a more active organic accelerator is desirable in the vulcanization process. We have found that the retarders of our invention are markedly effective in the presence of Permalux (the di-ortho-tolyl-guanidine salt of dicatechol borate), a very strong accelerator. This retarding effect is illustrated in Table VII, the neoprene being the same as employed in Table II.

Table VII

|  | Stock | | | | | | | | | | | |
|---|---|---|---|---|---|---|---|---|---|---|---|---|
|  | 22 | 23 | 24 | 25 | 26 | 27 | 28 | 29 | 30 | 31 | 32 | 33 |
| Neoprene | 100.0 | 100.0 | 100.0 | 100.0 | 100.0 | 100.0 | 100.0 | 100.0 | 100.0 | 100.0 | 100.0 | 100.0 |
| Stearic acid | 2.0 | 2.0 | 2.0 | 2.0 | 2.0 | 2.0 | 2.0 | 2.0 | 2.0 | 2.0 | 2.0 | 2.0 |
| Phenyl alpha naphthylamine | 1.0 | 1.0 | 1.0 | 1.0 | 1.0 | 1.0 | 1.0 | 1.0 | 1.0 | 1.0 | 1.0 | 1.0 |
| Extra light calcined magnesia | 4.0 | 4.0 | 4.0 | 4.0 | 4.0 | 4.0 | 4.0 | 4.0 | 4.0 | 4.0 | 4.0 | 4.0 |
| Channel carbon black | 10.0 | 10.0 | 10.0 | 10.0 | 10.0 | 10.0 | 10.0 | 10.0 | 10.0 | 10.0 | 10.0 | 10.0 |
| Zinc oxide | 5.0 | 5.0 | 5.0 | 5.0 | 5.0 | 5.0 | 5.0 | 5.0 | 5.0 | 5.0 | 5.0 | 5.0 |
| Permalux |  | 1.0 | 1.0 | 1.0 | 1.0 | 1.0 | 1.0 | 1.0 | 1.0 | 1.0 | 1.0 | 1.0 |
| Sodium acetate |  |  | 1.0 |  |  |  |  |  |  |  |  |  |
| Magnesium acetate |  |  |  |  | 1.0 |  |  |  |  |  |  |  |
| Manganese acetate |  |  |  |  |  | 1.0 |  |  |  |  |  |  |
| Cobalt acetate |  |  |  |  |  |  | 1.0 |  |  |  |  |  |
| Barium acetate |  |  |  |  |  |  |  | 1.0 |  |  |  |  |
| Aluminum acetate |  |  |  |  |  |  |  |  | 1.0 |  |  |  |
| Vanadium acetate |  |  |  |  |  |  |  |  |  | 1.0 |  |  |
| Calcium acetate |  |  |  |  |  |  |  |  |  |  | 1.0 |  |
| Lead acetate |  |  |  |  |  |  |  |  |  |  |  | 1.0 |
| Iron acetate |  |  |  |  |  |  |  |  |  |  |  | 1.0 |

CURE: 60 MIN. AT 227° F.

| | | | | | | | | | | | | |
|---|---|---|---|---|---|---|---|---|---|---|---|---|
| Modulus at 600%, lbs./sq. in | 50 | 1,350 |  | 250 | 425 | 950 | 1,250 | 1,075 | 1,200 | 1,325 | 1,200 | 1,225 |
| Tensile strength, lbs./sq. in | 500 | 3,525 | 325 | 875 | 1,500 | 2,650 | 2,625 | 2,950 | 3,100 | 3,150 | 3,250 | 3,250 |
| Elongation at break, per cent | 1,395 | 860 | 1,450 | 1,060 | 1,245 | 965 | 825 | 925 | 910 | 860 | 945 | 910 |

CURE: 60 MIN. AT 274° F.

| | | | | | | | | | | | | |
|---|---|---|---|---|---|---|---|---|---|---|---|---|
| Modulus at 600%, lbs./sq. in | 1,450 | 2,175 | 2,125 | 2,125 | 2,225 | 2,100 | 2,250 | 2,250 | 2,225 | 2,350 | 2,150 | 2,150 |
| Tensile strength, lbs./sq. in | 3,850 | 3,175 | 3,250 | 2,875 | 3,200 | 2,850 | 2,575 | 2,900 | 3,000 | 3,175 | 3,175 | 3,000 |
| Elongation at break, per cent | 900 | 685 | 730 | 675 | 690 | 660 | 640 | 670 | 680 | 650 | 710 | 670 |
| Hardness (Shore) | 50 | 55 | 54 | 55 | 56 | 55 | 55 | 55 | 55 | 55 | 55 | 55 |
| Stability test at 120° |  |  |  |  |  |  |  |  |  |  |  |  |
| No. of days to set up | 6 | 3 | 11 |  |  |  |  |  |  |  |  |  |

It can be seen from these data that the retarding action produced by the metallic salts of acetic acid is markedly pronounced in the presence of a strong accelerator. It is noted that the magnitude of the retarding action produced by a salt of a given acid varies somewhat according to the metal employed.

It can be seen from the above data that organic accelerators make the stock very "scorchy," as determined by the so-called stability test conducted at 120° F. The addition of a retarder of our invention definitely improves the stability of these stocks.

The most effective salts appear to be those in which the metal is a member of the alkali metal group of the elements. See Stock No. 24, Table VII; Stocks Nos. 10 and 11, Table IV; and Stocks Nos. 13, 14, 15 and 16, Table V. The ammonium and particularly the substituted ammonium radicals are frequently classified as members of the alkali metal group.

Likewise, the retarding action produced by these materials is equally as effective with catechol, an "ultra" accelerator for neoprene. To illustrate this fact, the following stocks were tested, the neoprene being the same as employed in Table II.

CURE: 60 MIN. AT 274° F.

|  | Stock | | |
| --- | --- | --- | --- |
|  | 34 | 35 | 36 |
| Modulus at 600%, lbs./sq. in | 1,350 | 2,100 | 1,750 |
| Tensile strength, lbs./sq. in | 4,050 | 3,250 | 3,800 |
| Elongation at break (percent) | 960 | 800 | 870 |
| Hardness (Shore) | 51 | 52 | 52 |
| Stability test at 120° F | | | |
| No. of days to set up | 6 | 2 | 7 |

It can be seen from these data that the retarding action of sodium acetate is very pronounced in the presence of an "ultra" accelerator, such as catechol.

For certain neoprene stocks it is often desirable to employ a combination of organic accelerators in the vulcanization process for producing specific properties. We have found the retarders of our invention to be markedly effective in the presence of combinations of organic accelerators. To illustrate the advantage obtainable by the use of sodium acetate in conjunction with various combinations of organic accelerators, the following stocks were prepared, in which the neoprene is the same as employed in Table II.

Table IX

|  | Stock | | | | | | | | | | | | | |
| --- | --- | --- | --- | --- | --- | --- | --- | --- | --- | --- | --- | --- | --- | --- |
|  | 37 | 38 | 39 | 40 | 41 | 42 | 43 | 44 | 45 | 46 | 47 | 48 | 49 | 50 |
| Neoprene | 100.0 | 100.0 | 100.0 | 100.0 | 100.0 | 100.0 | 100.0 | 100.0 | 100.0 | 100.0 | 100.0 | 100.0 | 100.0 | 100.0 |
| Stearic acid | 2.0 | 2.0 | 2.0 | 2.0 | 2.0 | 2.0 | 2.0 | 2.0 | 2.0 | 2.0 | 2.0 | 2.0 | 2.0 | 2.0 |
| Phenyl alpha naphthylamine | 1.0 | 1.0 | 1.0 | 1.0 | 1.0 | 1.0 | 1.0 | 1.0 | 1.0 | 1.0 | 1.0 | 1.0 | 1.0 | 1.0 |
| Extra light calcined magnesia | 4.0 | 4.0 | 4.0 | 4.0 | 4.0 | 4.0 | 4.0 | 4.0 | 4.0 | 4.0 | 4.0 | 4.0 | 4.0 | 4.0 |
| Channel carbon black | 10.0 | 10.0 | 10.0 | 10.0 | 10.0 | 10.0 | 10.0 | 10.0 | 10.0 | 10.0 | 10.0 | 10.0 | 10.0 | 10.0 |
| Zinc oxide | 5.0 | 5.0 | 5.0 | 5.0 | 5.0 | 5.0 | 5.0 | 5.0 | 5.0 | 5.0 | 5.0 | 5.0 | 5.0 | 5.0 |
| Sodium acetate |  | 1.0 |  | 1.0 |  | 1.0 |  | 1.0 |  | 1.0 |  | 1.0 |  | 1.0 |
| Parazone | 1.0 | 1.0 | 1.0 | 1.0 | 1.0 | 1.0 | 1.0 | 1.0 | 1.0 | 1.0 | 1.0 | 1.0 | 1.0 | 1.0 |
| Permalux | 1.0 | 1.0 |  |  |  |  |  |  |  |  |  |  |  |  |
| Catechol |  |  | 0.50 | 0.50 |  |  |  |  |  |  |  |  |  |  |
| Pyrogallol |  |  |  |  | 0.25 | 0.25 |  |  |  |  |  |  |  |  |
| Hexa-methylene tetramine |  |  |  |  |  |  | 1.0 | 1.0 |  |  |  |  |  |  |
| Salicylic acid |  |  |  |  |  |  |  |  | 1.0 | 1.0 |  |  |  |  |
| Beta naphthoquinone |  |  |  |  |  |  |  |  |  |  | 1.0 | 1.0 |  |  |
| Para aminophenol |  |  |  |  |  |  |  |  |  |  |  |  | 1.0 | 1.0 |

CURE: 60 MIN. AT 227° F.

| | 37 | 38 | 39 | 40 | 41 | 42 | 43 | 44 | 45 | 46 | 47 | 48 | 49 | 50 |
| --- | --- | --- | --- | --- | --- | --- | --- | --- | --- | --- | --- | --- | --- | --- |
| Modulus at 600% | 1,550 | No cure | 1,300 / 3,275 | 200 | 850 | 375 | 750 | 375 | 525 | 150 | 250 | 50 | 1,100 | 775 |
| Tensile strength | 4,000 |  | 885 | 725 | 2,175 | 1,225 | 1,950 | 1,050 | 1,950 | 525 | 1,550 | 650 | 3,475 | 2,200 |
| Elongation at break, per cent | 900 |  |  | 1,375 | 1,005 | 1,270 | 960 | 1,285 | 1,260 | 1,420 | 1,320 | 1,485 | 1,020 | 1,160 |

CURE: 60 MIN. AT 274° F.

| | 37 | 38 | 39 | 40 | 41 | 42 | 43 | 44 | 45 | 46 | 47 | 48 | 49 | 50 |
| --- | --- | --- | --- | --- | --- | --- | --- | --- | --- | --- | --- | --- | --- | --- |
| Modulus at 600% | 2,525 | 2,350 | 2,250 | 2,050 | 2,100 | 2,050 | | | 1,500 | 1,800 | 1,650 | 1,875 | 2,000 | 2,225 |
| Tensile strength | 3,425 | 3,725 | 2,925 | 3,250 | 2,750 | 3,200 | 2,200 | 2,250 | 4,175 | 3,475 | 3,850 | 3,650 | 3,425 | 3,000 |
| Elongation at break, per cent | 685 | 740 | 665 | 750 | 680 | 735 | 570 | 575 | 925 | 820 | 845 | 815 | 765 | 685 |
| Hardness (Shore) | 57 | 55 | 55 | 54 | 54 | 54 | 55 | 55 | 51 | 53 | 53 | 54 | 54 | 55 |

Table VIII

|  | Stock | | |
| --- | --- | --- | --- |
|  | 34 | 35 | 36 |
| Neoprene | 100.0 | 100.0 | 100.0 |
| Stearic acid | 2.0 | 2.0 | 2.0 |
| Phenyl alpha naphthylamine | 1.0 | 1.0 | 1.0 |
| Extra light calcined magnesia | 4.0 | 4.0 | 4.0 |
| Channel carbon black | 10.0 | 10.0 | 10.0 |
| Zinc oxide | 5.0 | 5.0 | 5.0 |
| Catechol |  | 0.50 | 0.50 |
| Sodium acetate |  |  | 1.0 |

CURE: 60 MIN. AT 227° F.

| | 34 | 35 | 36 |
| --- | --- | --- | --- |
| Modulus at 600%, lbs./sq. in |  | 275 | 1,400 |
| Tensile strength, lbs./sq. in |  | 1,360 | 3,750 / 860 | 325 / 1,330 |
| Elongation at break, percent |  |  |  |

From these data it is plainly seen that the retarding action, produced by sodium acetate on the rate of vulcanization in the cure at 227° F. is remarkable with either mild (Parazone), strong (Permalux) or "ultra" (catechol) accelerators. Accelerators, and accelerator-activators usually employed in rubber vulcanization are likewise retarded by sodium acetate, when used in the vulcanization of neoprene. Stocks Nos. 43 and 44 show the retarding effect produced by sodium acetate in conjunction with hexamethylene tetramine (a rubber accelerator). Stocks Nos. 45, 46 and 49, 50, respectively, show the retarding effect produced by sodium acetate in conjunction with salicylic acid and para aminophenol (rubber accelerator-activators). Stocks Nos. 47 and 48 show the retarding effect produced by sodium acetate in conjunction with beta naphthoquinone.

The retarding effect produced by these materials is not restricted to the vulcanization of neoprene of a particular type. We have found that this retarding effect is also observed in various types of chloro-2-butadiene-1,3 polymers. To illustrate this, the following stocks were tested.

Table X

|  | Stock | | | | | | | | | |
|---|---|---|---|---|---|---|---|---|---|---|
|  | 51 | 52 | 53 | 54 | 55 | 56 | 57 | 58 | 59 | 60 |
| Neoprene [1] | 100.0 | 100.0 | 100.0 | 100.0 | | | | | | |
| Neoprene [2] | | | | | 100.0 | 100.0 | | | | |
| Neoprene [3] | | | | | | | 100.0 | 100.0 | 100.0 | 100.0 |
| Stearic acid | 2.0 | 2.0 | 2.0 | 2.0 | 2.0 | 2.0 | 2.0 | 2.0 | 2.0 | 2.0 |
| Phenyl alpha naphthylamine | 1.0 | 1.0 | 1.0 | 1.0 | 1.0 | 1.0 | 1.0 | 1.0 | 1.0 | 1.0 |
| Parazone | 1.0 | 1.0 | 1.0 | 1.0 | 1.0 | 1.0 | 1.0 | 1.0 | 1.0 | 1.0 |
| Extra light calcined magnesia | 10.0 | 10.0 | 10.0 | 10.0 | 5.0 | 5.0 | 10.0 | 10.0 | 10.0 | 10.0 |
| Channel carbon black | 10.0 | 10.0 | 10.0 | 10.0 | 11.0 | 11.0 | 10.0 | 10.0 | 10.0 | 10.0 |
| Zinc oxide | 10.0 | 10.0 | 10.0 | 10.0 | 5.0 | 5.0 | 10.0 | 10.0 | 10.0 | 10.0 |
| Sulfur | | | | | 1.0 | 1.0 | | | | |
| FF wood rosin | 5.0 | 5.0 | 5.0 | 5.0 | | | | | | |
| Sodium acetate | | 1.0 | | 1.0 | | 1.0 | | 1.0 | | 1.0 |
| Permalux | | | 1.0 | 1.0 | | | | | 1.0 | 1.0 |

[1] Neoprene prepared according to the method described in U. S. P. 2,259,122, Example No. 15.
[2] Neoprene prepared according to the method described in Example 1 of British Patent 573,024.
[3] Neoprene prepared according to the method described in U. S. Patent 2,395,649.

CURE: 60 MIN. AT 227° F.

|  | 51 | 52 | 53 | 54 | 55 | 56 | 57 | 58 | 59 | 60 |
|---|---|---|---|---|---|---|---|---|---|---|
| Modulus at 600% | 575 | 500 | 1,250 | 625 | 925 | | 600 | 425 | 1,300 | 850 |
| Tensile strength | 2,200 | 1,450 | 2,700 | 1,825 | 1,600 | 925 | 1,350 | 900 | 2,950 | 2,350 |
| Elongation at break, percent | 1,210 | 1,185 | 880 | 1,120 | 780 | 840 | 1,000 | 1,030 | 860 | 960 |

CURE: 60 MIN. AT 274° F.

|  | 51 | 52 | 53 | 54 | 55 | 56 | 57 | 58 | 59 | 60 |
|---|---|---|---|---|---|---|---|---|---|---|
| Modulus at 600% | 1,475 | 1,275 | 2,050 | 1,800 | | | 1,625 | 2,025 | 2,225 | 2,250 |
| Tensile strength | 2,950 | 2,700 | 2,600 | 2,675 | 600 | 650 | 3,225 | 3,200 | 3,250 | 3,125 |
| Elongation at break, percent | 860 | 850 | 680 | 710 | 250 | 240 | 800 | 760 | 740 | 740 |
| Hardness (Shore) | 48 | 45 | 50 | 51 | 51 | 52 | 54 | 54 | 55 | 56 |

As illustrated in the above tables, the retarding effect produced by sodium acetate and related compounds takes place in neoprene of various types so that the invention is applicable in preventing premature curing of polymerized chloro-2-butadiene-1,3 itself or when it is modified by copolymerization or interpolymerization with other materials that may be polymerized therewith to change the characteristics of the resulting rubber-like material.

While in the above examples a relatively small number of metallic salts of organic mono-carboxylic acids having a dissociation constant of less than $1.0 \times 10^{-3}$ have been mentioned, it is to be understood that these examples are given merely to illustrate the invention, and that the invention is not limited to the use of these particular compounds. As further illustrative of the type of salts that may be employed are alkali metal or ammonium salts of the more commonly known aliphatic acids such as propionic acid, butyric acid, valeric acid, capric acid, heptoic acid, Pelargonic acid, lauric acid, stearic acid, crotonic acid, oleic acid, propiolic acid, sorbic acid, linoleic acid, glycolic acid, and lactic acid, beta hydroxy propionic acid, and the aromatic acids of the benzene and naphthalene series such as alpha-naphthoic acid, beta-naphthoic acid, benzoic acid, etc. For the purpose of this invention the use of the aliphatic acids, particularly those otherwise unsubstituted aliphatic acids that contain only C and H in the alkyl chain is preferred, and more particularly those of lower molecular weight, of from 1 to 7 carbon atoms. Because of its availability and relatively low price and because of the efficiency with which it operates as a retarder, sodium acetate is the preferred salt for retarding the vulcanization of neoprene artificial rubber. The preferred salts of these acids are the alkali metal, ammonium and substituted ammonium salts.

The metallic salts of the acids of the type above mentioned may be employed either alone or in conjunction with organic accelerators. It is, of course, obvious that compounding ingredients and fillers other than those mentioned in the above tables may be employed, and in different proportions.

The amount of retarders when used either alone or in conjunction with organic accelerators will usually comprise from about 0.10 part to 10 parts for every 100 parts of polymerized chloro-2-butadiene-1,3, and preferably from about 0.50 part to 4.0 parts.

Use of these metallic salts produces neoprene stocks which are safe from premature curing or vulcanizing at processing temperatures, yet which retain their curing characteristics at normal curing temperatures, the resulting vulcanizates exhibiting exceedingly good resistance toward deterioration by heat or oxidation, good resistance to tear and improved resiliency.

We claim:

1. A vulcanizable composition comprising polymerized chloro-2-butadiene-1,3, having intimately incorporated therein zinc oxide and magnesium oxide in sufficient amounts to effect vulcanization of the polymerized chloro-2-butadiene-1,3 at vulcanizing temperatures, and from 0.10 to 10 parts of a metallic salt of an organic mono-carboxylic acid per 100 parts of the polymerized chloro-2-butadiene-1,3, which acid has a dissociation constant less than $1.0 \times 10^{-3}$.

2. A vulcanizable composition comprising polymerized chloro-2-butadiene-1,3, having intimately incorporated therein zinc oxide and magnesium oxide in sufficient amounts to effect vulcanization of the polymerized chloro-2-butadiene-1,3 at vulcanizing temperatures, and from 0.10 to 10 parts of a sodium salt of an organic mono-carboxylic acid per 100 parts of the polymerized chloro-2-butadiene-1,3, which acid has a dissociation constant less than $1.0 \times 10^{-3}$.

3. A vulcanizable composition comprising polymerized chloro-2-butadiene-1,3, having intimately incorporated therein zinc oxide and magnesium oxide in sufficient amounts to effect vulcanization of the polymerized chloro-2-butadiene-1,3 at vulcanizing temperatures, and from 0.10 to 10 parts of sodium acetate per 100 parts of the polymerized chloro-2-butadiene-1,3.

4. A composition comprising polymerized chloro-2-butadiene-1,3 having incorporated therein prior to vulcanization zinc oxide, magnesium oxide and from 0.10 to 10 parts of a metallic salt of an organic mono-carboxylic acid per 100 parts of the polymerized chloro-2-butadiene-1,3, which acid has a dissociation constant less than $1.0 \times 10^{-3}$.

5. Vulcanized polymerized chloro-2-butadiene-1,3 having incorporated therein prior to vulcanization zinc oxide, magnesium oxide and from 0.10 to 10 parts of an alkali metal salt of an organic mono-carboxylic acid per 100 parts of the polymerized chloro-2-butadiene-1,3, which acid has a dissociation constant less than $1.0 \times 10^{-3}$.

6. Vulcanized polymerized chloro-2-butadiene-1,3 having incorporated therein prior to vulcanization zinc oxide, magnesium oxide and from 0.10 to 10 parts of a sodium salt of an organic monocarboxylic acid per 100 parts of the polymerized chloro-2-butadiene-1,3, which acid has a dissociation constant less than $1.0 \times 10^{-3}$.

7. Vulcanized polymerized chloro-2-butadiene-1,3 having incorporated therein prior to vulcanization zinc oxide, magnesium oxide and from 0.10 to 10 parts of an alkali metal salt of an aliphatic mono-carboxylic acid per 100 parts of the polymerized chloro-2-butadiene-1,3, which acid has a dissociation constant less than $1.0 \times 10^{-3}$.

8. Vulcanized polymerized chloro-2-butadiene-1,3 having incorporated therein prior to vulcanization zinc oxide, magnesium oxide and from 0.10 to 10 parts of an alkali metal salt of an aliphatic monocarboxylic acid containing only H and C in an alkyl chain, per 100 parts of the polymerized chloro-2-butadiene-1,3, which acid has a dissociation constant less than $1.0 \times 10^{-3}$.

9. Vulcanized polymerized chloro-2-butadiene-1,3 having incorporated therein prior to vulcanization zinc oxide, magnesium oxide and from 0.10 to 10 parts of an alkali metal salt of an aliphatic mono-carboxylic acid containing from 1 to 7 carbon atoms and containing only H and C in an alkyl chain, per 100 parts of the polymerized chloro-2-butadiene-1,3, which acid has a dissociation constant less than $1.0 \times 10^{-3}$.

10. Vulcanized polymerized chloro-2-butadiene-1,3 having incorporated therein prior to vulcanization zinc oxide, magnesium oxide and from 0.10 to 10 parts of sodium acetate per 100 parts of the polymerized chloro-2-butadiene-1,3.

11. Vulcanized polymerized chloro-2-butadiene-1,3 having incorporated therein prior to vulcanization zinc oxide, magnesium oxide and from 0.10 to 10 parts of an alkali metal salt of an aromatic mono-carboxylic acid of the benzene and naphthalene series per 100 parts of the polymerized chloro-2-butadiene-1,3.

12. A vulcanizable composition comprising polymerized chloro-2-butadiene-1,3 having intimately incorporated therein zinc oxide and magnesium oxide in sufficient amounts to effect vulcanization of the chloro-2-butadiene-1,3 at vulcanizing temperatures, and from 0.10 to 10 parts of an alkali metal salt of an organic monocarboxylic acid per 100 parts of the polymerized chloro-2-butadiene-1,3, which acid has a dissociation constant less than $1.0 \times 10^{-3}$.

13. A vulcanizable composition comprising polymerized chloro-2-butadiene-1,3 having intimately incorporated therein zinc oxide and magnesium oxide in sufficient amounts to effect vulcanization of the chloro-2-butadiene-1,3 at vulcanizing temperatures, and from 0.10 to 10 parts of an alkali metal salt of an aliphatic monocarboxylic acid per 100 parts of the polymerized chloro-2-butadiene-1,3, which acid has a dissociation constant less than $1.0 \times 10^{-3}$.

14. A vulcanizable composition comprising polymerized chloro-2-butadiene-1,3 having intimately incorporated therein zinc oxide and magnesium oxide in sufficient amounts to effect vulcanization of the chloro-2-butadiene-1,3 at vulcanizing temperatures, and from 0.10 to 10 parts of an alkali metal salt of an aliphatic monocarboxylic acid, containing only H and C in an alkyl chain, per 100 parts of the polymerized chloro-2-butadiene-1,3 which acid has a dissociation constant less than $1.0 \times 10^{-3}$.

15. A vulcanizable composition comprising polymerized chloro-2-butadiene-1,3 having intimately incorporated therein zinc oxide and magnesium oxide in sufficient amounts to effect vulcanization of the chloro-2-butadiene-1,3 at vulcanizing temperatures, and from 0.10 to 10 parts of an alkali metal salt of an aliphatic monocarboxylic acid, containing from 1 to 7 carbon atoms and containing only H and C in an alkyl chain, per 100 parts of the polymerized chloro-2-butadiene-1,3, which acid has a dissociation constant less than $1.0 \times 10^{-3}$.

16. A vulcanizable composition comprising polymerized chloro-2-butadiene-1,3 having intimately incorporated therein zinc oxide and magnesium oxide in sufficient amounts to effect vulcanization of the chloro-2-butadiene-1,3 at vulcanizing temperatures, and from 0.10 to 10 parts of an alkali metal salt of an aromatic monocarboxylic acid of the benzene and naphthalene series per 100 parts of the polymerized chloro-2-butadiene-1,3, which acid has a dissociation constant less than $1.0 \times 10^{-3}$.

JAMES P. NOWLEN.
MAYNARD F. TORRENCE.